(12) United States Patent
McNab

(10) Patent No.: US 10,637,731 B2
(45) Date of Patent: Apr. 28, 2020

(54) CLOUD-ENABLED I/O CONFIGURATION OF A CONTROL SYSTEM

(71) Applicant: INTELLIGENT PLATFORMS, LLC, Charlottesville, VA (US)

(72) Inventor: Keith George McNab, Albany, NY (US)

(73) Assignee: INTELLIGENT PLATFORMS, LLC, Charlottesville, VA (US)

(*) Notice: Subject to any disclaimer, the term of this patent is extended or adjusted under 35 U.S.C. 154(b) by 316 days.

(21) Appl. No.: 15/599,098

(22) Filed: May 18, 2017

(65) Prior Publication Data

US 2018/0176335 A1    Jun. 21, 2018

Related U.S. Application Data

(60) Provisional application No. 62/435,610, filed on Dec. 16, 2016.

(51) Int. Cl.
*H04L 12/24* (2006.01)
*H04L 29/08* (2006.01)
(Continued)

(52) U.S. Cl.
CPC ........ *H04L 41/0869* (2013.01); *G05B 19/042* (2013.01); *G05B 19/0423* (2013.01);
(Continued)

(58) Field of Classification Search
CPC .................................................. H04L 41/0869
See application file for complete search history.

(56) References Cited

U.S. PATENT DOCUMENTS 5,265,241 A * 11/1993 Arnold ................... H04L 29/00
709/223
5,339,430 A   8/1994 Lundin et al.
(Continued)

FOREIGN PATENT DOCUMENTS

CN      102354174 A    2/2012
CN      202218269 U    5/2012
(Continued)

OTHER PUBLICATIONS

"Miller, D.H., et al., Industrial internet connected control system, GE Pending Application No. 621435610, filed on Dec. 16, 2016".
(Continued)

*Primary Examiner* — Philip C Lee
(74) *Attorney, Agent, or Firm* — Marshall, Gerstein & Borun LLP

(57) ABSTRACT

A system and method for configuring a cloud-enabled industrial control system is disclosed involving a cloud computing system receiving instrument data, configuring the instrument data to create an instrument index, alerting and automatically correcting, by a cloud service, configuration errors in the instrument index that occurred during the configuration of the instrument data; creating, by at least a rules engine cloud service using the instrument index, a hardware layout for at least a portion of the cloud-enabled industrial control system; and assigning, by the rules engine cloud service, input/output (I/O) points from the instrument index to the hardware layout to create an I/O configuration file for the cloud-enabled industrial control system.

20 Claims, 6 Drawing Sheets

(51) Int. Cl.
| | |
|---|---|
| *G06F 8/73* | (2018.01) |
| *H04L 12/26* | (2006.01) |
| *H04W 4/00* | (2018.01) |
| *G05B 19/042* | (2006.01) |
| *G06F 8/65* | (2018.01) |
| *G06F 21/57* | (2013.01) |
| *G05B 19/418* | (2006.01) |
| *H04W 4/38* | (2018.01) |

(52) U.S. Cl.
CPC ..... *G05B 19/0426* (2013.01); *G05B 19/4185* (2013.01); *G05B 19/4186* (2013.01); *G05B 19/4187* (2013.01); *G05B 19/41835* (2013.01); *G06F 8/65* (2013.01); *G06F 8/73* (2013.01); *G06F 21/577* (2013.01); *H04L 43/50* (2013.01); *H04L 67/10* (2013.01); *H04L 67/34* (2013.01); *H04W 4/00* (2013.01); *H04W 4/38* (2018.02); *G05B 2219/21086* (2013.01); *G05B 2219/24071* (2013.01); *G05B 2219/25064* (2013.01); *H04L 41/0253* (2013.01); *H04L 41/24* (2013.01); *Y02P 90/18* (2015.11); *Y02P 90/28* (2015.11); *Y02P 90/86* (2015.11)

(56) References Cited

U.S. PATENT DOCUMENTS

| | | | |
|---|---|---|---|
| 6,668,374 | B1 | 12/2003 | Sten et al. |
| 7,010,294 | B1 | 3/2006 | Pyotsia et al. |
| 7,203,560 | B1 | 4/2007 | Wylie et al. |
| 7,263,546 | B1 | 8/2007 | Kostadinov |
| 7,355,730 | B2 | 4/2008 | Landau et al. |
| 7,493,612 | B2 | 2/2009 | Tzeng |
| 7,669,197 | B1 | 2/2010 | O'Neill et al. |
| 7,673,298 | B2 | 3/2010 | Oyama |
| 7,987,305 | B2 | 7/2011 | Blair et al. |
| 8,155,041 | B2 | 4/2012 | Hong et al. |
| 8,276,009 | B2 | 9/2012 | King |
| 8,451,753 | B2 | 5/2013 | Vanga et al. |
| 8,601,170 | B1 | 12/2013 | Marr et al. |
| 8,681,571 | B2 | 3/2014 | Fox et al. |
| 8,756,041 | B2 | 6/2014 | Maturana et al. |
| 8,887,056 | B2 | 11/2014 | Breternitz et al. |
| 9,063,639 | B2 | 6/2015 | Grewal |
| 9,253,054 | B2 | 2/2016 | Maturana et al. |
| 9,798,534 | B1 | 10/2017 | Yi et al. |
| 10,095,202 | B2 * | 10/2018 | Maturana ........... G05B 19/0423 |
| 2006/0179058 | A1 | 8/2006 | Bram et al. |
| 2008/0114902 | A1 | 5/2008 | Leong et al. |
| 2008/0127356 | A1 | 5/2008 | Hsu et al. |
| 2009/0076628 | A1 | 3/2009 | Smith et al. |
| 2010/0023140 | A1 | 1/2010 | Kodama et al. |
| 2011/0022192 | A1 | 1/2011 | Plache et al. |
| 2012/0291021 | A1 | 11/2012 | Banerjee et al. |
| 2013/0191106 | A1 | 7/2013 | Kephart et al. |
| 2013/0211559 | A1 | 8/2013 | Lawson et al. |
| 2014/0075015 | A1 | 3/2014 | Chan et al. |
| 2014/0101652 | A1 | 4/2014 | Kamble et al. |
| 2014/0189677 | A1 | 7/2014 | Curzi et al. |
| 2014/0335480 | A1 | 11/2014 | Asenjo et al. |
| 2014/0336795 | A1 | 11/2014 | Asenjo et al. |
| 2015/0012763 | A1 | 1/2015 | Cohen et al. |
| 2015/0019191 | A1 * | 1/2015 | Maturana ................ G05B 17/02 703/13 |
| 2015/0082309 | A1 | 3/2015 | Lambert et al. |
| 2015/0287318 | A1 | 10/2015 | Nair et al. |
| 2016/0132538 | A1 | 5/2016 | Bliss et al. |
| 2016/0161930 | A1 * | 6/2016 | Jirkovsk ................ G05B 17/02 700/29 |
| 2016/0274552 | A1 | 9/2016 | Strohmenger et al. |
| 2016/0330082 | A1 * | 11/2016 | Bliss ..................... H04L 41/22 |
| 2017/0132332 | A1 * | 5/2017 | Takamura ........... G06F 17/5004 |
| 2017/0337226 | A1 * | 11/2017 | Bliss ..................... G06F 16/907 |
| 2018/0074987 | A1 * | 3/2018 | Alley ..................... G06F 13/382 |
| 2018/0176335 | A1 | 6/2018 | McNab |

FOREIGN PATENT DOCUMENTS

| | | | |
|---|---|---|---|
| EP | 2688019 | 1/2014 | |
| EP | 2924570 A2 | 9/2015 | |
| WO | WO-2016017630 A1 * | 2/2016 | ......... G06F 17/5004 |

OTHER PUBLICATIONS

"International Search Report and Written Opinion issued in connection with corresponding PCT Application No. PCT/US2017/60089 dated Feb. 14, 2018".

"International Search Report and Written Opinion issued in connection with corresponding PCT Application No. PCT/US2017/064382 dated Mar. 15, 2018".

"Renesas Electronics Announces Development of Virtualization Technology Suitable for Real-Time Processing of V850CPU Core. Oct. 12, 2010, https://lwww.renesas.com/en-hq/about/press-center/news/2010/news20101012a.html, last visited Aug. 9, 2017, 3 pp."

Achieving Real-Time Performance on a Virtualized Industrial Control Platform. http://https://www.intel.com/content/dam/www/public/us/en/documents/white-papers/industrial-solutions-real-timeperformance-white-paper.pdf, last visited Jul. 15, 2014, 7 pp.

Grugon, Chris, "The need for embedded virtualization in real-time, multiprocessor, multi-OS systems," http://embedded-computing.com/articles/the-multiprocessor-multi-os-systems/, last visited Jun. 2016, 7 pp.

"Distributed control system software upgrade, NovaTech's updated DCS software, D/3 Version 15 (D3v15) addsfeatures that are focused on modernizing configuration, improving operator interfaces, and facilitating reporting, http://www.controleng.com/single-article/distributed-control-system-software-upgrade/~24abcb53c6f4f851d05cd17293ea2c.html, last visited Apr. 5, 2016, 2 pp."

"Thorve, Nitin et al., ""Step-by-step guide to IBM Power Systems firmware update"", License Internal Code {LIC} upgrade process, Mar. 26, 2013, https://www.ibm.com/developerworks/aix/tutorials/au-power-systems-1rmware-upgrade/au-power-systems-firmware-upgrade-pdf.pdf., 28 pp."

Feld, Joachim, "Profinet-Scalable Factory Communication for All Applications", Factory A10 Communication Systems, 2004. Proceedings. 2004 IEEE International Workshop, pp. 33-38 (2004).

Electrical and Instrumentation Loop Check, IEC Webstore International Electrotechnical Commission, Edition 2.0, pp. 42 (2012).

Hazarika, Pinku et al., "Mobile Cloud Integration for Industrial Data Interchange", Advances in Computing, Communications and Informatics (ICACCI), pp. 1118-1122 (2015).

Welander, Make your I/O smarter, Control Engineering, www.controleng.com/single-article/make-your-io-smarter/37788148d81ce850279c60f46135457b.html, As Accessed Jan. 2013.

Leading Technology in Ethernet Relays, Data Acquisition, and Remote Monitoring, ControlByWeb, www.controlbyweb.com/, As Accessed Aug. 4, 2016.

Advantech Launches WISE-4051: RS-485 Wireless I/O Module with Cloud Connectivity and IoT Protocol, Advantech Co Ltd, www2.advantech.in/eautomation/remote-io/news.aspx?doc_id=88f8f32e-fc95-4484-a02c-80543cf7fd56, As Accessed Jul. 11, 2016.

* cited by examiner

CLOUD-ENABLED I/O CONFIGURATION OF A CONTROL SYSTEM

CROSS REFERENCE TO RELATED APPLICATION

This application claims priority to and benefit of U.S. Provisional Patent Application Ser. No. 62/435,610 filed Dec. 16, 2016, which is fully incorporated by reference and made a part hereof.

TECHNICAL FIELD

The present disclosure relates to industrial control systems and more specifically, to the configuration of a cloud-enabled industrial control system, wherein the connection to the cloud enables improved and more efficient input/output (I/O) configuration.

BACKGROUND

Configuring a control system generally involves programming of the control system to recognize various I/O and making physical connections of the I/O to the correct points on I/O modules. Typically, the I/O configuration is performed using software such as SmartPlant™ (Intergraph, a part of Hexagon AB, Stockholm, Sweden), and the like. However, once the configuration is designed using software, engineers and technicians manually configure the hardware and software for each I/O point of the control system. This can be a time-intensive and labor-intensive effort, which can greatly increase configuration and commissioning costs.

A need, therefore, exists for a method and system that overcomes challenges in the art, some of which are described above.

SUMMARY

Disclosed and described herein are systems and methods of creating a configuration file for a cloud-enabled industrial control system. One method comprises receiving, by a cloud computing system, instrument data; configuring the instrument data by providing access to the instrument data to one or more users through a collaborative configuration cloud service of the cloud computing system to create an instrument index, wherein the one or more users access the instrument data using one or more computing devices communicatively coupled to the cloud computing system; alerting and automatically correcting, by a cloud service, configuration errors in the instrument index that occurred during the configuration of the instrument data; creating, by a rules engine cloud service using the instrument index, a hardware layout for at least a portion of the cloud-enabled industrial control system; assigning, by the rules engine cloud service, input/output (I/O) points from the instrument index to the hardware layout to create an I/O configuration file for the cloud-enabled industrial control system; and transferring the I/O configuration file from the cloud computing system to the cloud-enabled industrial control system.

Alternatively or optionally, the method may further comprise configuring the cloud-enabled industrial control system according to the I/O configuration file.

Alternatively or optionally, the instrument data may comprise one or more of a process flow diagram (PFD), a piping and instrument diagram (P&ID), a loop diagram, and the like. In some instances, the instrument data may at least partially comprise an output from an instrumentation software program.

Alternatively or optionally, the cloud-enabled industrial control system may be a control system that is used to control a power-generating facility.

Alternatively or optionally, the method may further comprise storing one or more of the instrument index or the I/O configuration file in cloud storage.

Alternatively or optionally, the method may comprise using additional inputs to the rules engine for creating the hardware layout and assigning I/O points to the hardware layout to create the I/O configuration file, the additional inputs including one or more of object definitions for devices, layout rules and plant areas.

Also disclosed herein are systems for creating a configuration file for a cloud-enabled industrial control system. One such system comprises a cloud computing system, wherein the cloud computing system comprises at least a cloud platform and one or more cloud services executing on the cloud platform; and one or more computing devices communicatively coupled to the cloud computing system, wherein the cloud computing system: receives instrument data; provides access to the instrument data for configuration of the instrument data by one or more users through a configuration cloud service of the cloud computing system to create an instrument index, wherein the one or more users access the instrument data using the one or more computing devices communicatively coupled to the cloud computing system; alerts and automatically corrects, by a cloud service, configuration errors in the instrument index that occurred during the configuration of the instrument data; creates, by a rules engine cloud service using the instrument index, a hardware layout for at least a portion of the cloud-enabled industrial control system; assigns, by the rules engine cloud service, input/output (I/O) points from the instrument index to the hardware layout to create an I/O configuration file for the cloud-enabled industrial control system; and transfers the I/O configuration file from the cloud computing system to the cloud-enabled industrial control system.

Alternatively or optionally, the cloud-enabled industrial control system may be configured in accordance with the I/O configuration file.

The instrument data may comprise one or more of a process flow diagram (PFD), a piping and instrument diagram (P&ID), a loop diagram, and the like. In some instances the instrument data may at least partially comprise an output from an instrumentation software program.

In some instances the cloud-enabled industrial control system may be used to control a power-generating facility.

Alternatively or optionally, the system may further comprise cloud storage and one or more of the instrument index or the I/O configuration file are stored in the cloud storage.

Alternatively or optionally, the system may comprise the cloud computing system using additional inputs to the rules engine for creating the hardware layout and assigning I/O points to the hardware layout to create the I/O configuration file, the additional inputs including one or more of object definitions for devices, layout rules and plant areas.

Yet another system disclosed and described herein comprises a cloud-enabled industrial control system. The system comprises a cloud computing system, wherein the cloud computing system comprises at least a cloud platform, one or more cloud services executing on the cloud platform, and cloud storage; an industrial control system that is communicatively coupled with the cloud computing system; and one or more computing devices communicatively coupled to the cloud computing system, wherein the cloud computing system: receives instrument data; provides access to the instrument data for configuration of the instrument data by one or more users through a collaborative configuration cloud service of the cloud computing system to create an instrument index, wherein the one or more users access the instrument data using the one or more computing devices communicatively coupled to the cloud computing system; alerts and automatically correct, by an expert system cloud service, configuration errors in the instrument index that occurred during the configuration of the instrument data; creates, by a rules engine cloud service using at least the instrument index and one or more of object definitions for devices, layout rules and plant areas, a hardware layout for at least a portion of the industrial control system; assigns, by the rules engine cloud service, input/output (I/O) points from the instrument index to the hardware layout to create an I/O configuration file for the industrial control system; and transfers the I/O configuration file from the cloud computing system to the industrial control system.

Alternatively or optionally, the industrial control system may be configured in accordance with the I/O configuration file.

The instrument data may be comprised one or more of a process flow diagram (PFD), a piping and instrument diagram (P&ID), a loop diagram, and the like. In some instances, the instrument data at least partially comprises an output from an instrumentation software program.

In some instances the industrial control system may be used to control a power-generating facility.

Alternatively or optionally, one or more of the instrument index or the I/O configuration file are stored in the cloud storage.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The accompanying drawings, which are incorporated in and constitute a part of this specification, illustrate embodiments and together with the description, serve to explain the principles of the devices, methods and systems.

DETAILED DESCRIPTION

Figure 1:
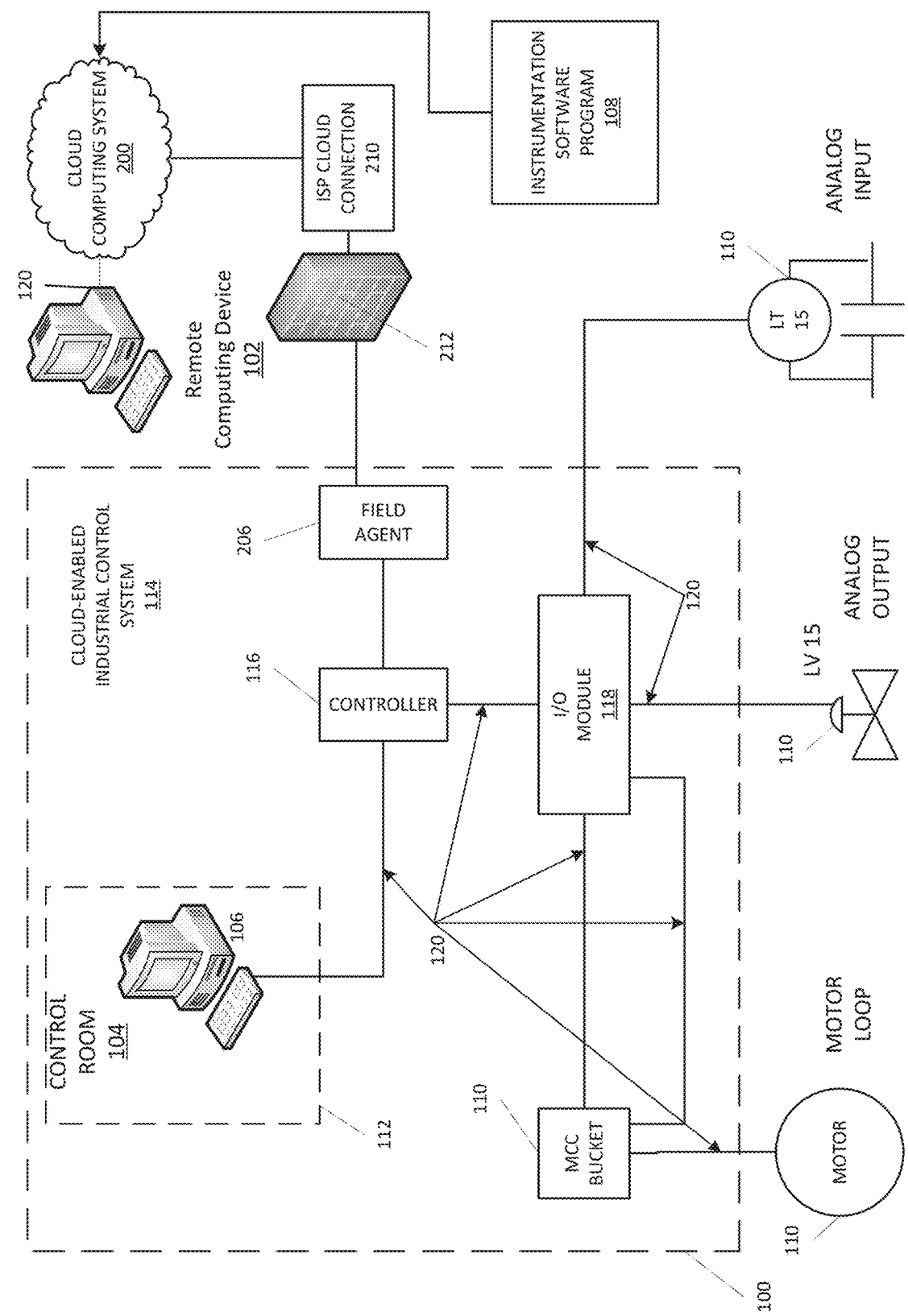
FIG. 1 schematically depicts a cloud-enabled industrial control system that benefits from the disclosed methods.

Before the present methods and systems are disclosed and described, it is to be understood that the methods and systems are not limited to specific methods and/or specific components. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. Furthermore, all or portions of aspects of the disclosed can be implemented using cloud-based processing and storage systems and capabilities. One such non-limiting example of a cloud-based service that can be used in implementations of the disclosed is GE Predix™, as available from the General Electric Company (Schenectady, N.Y.). Predix™ is a cloud-based PaaS (platform as a service) that enables industrial-scale analytics for asset performance management (APM) and operations optimization by providing a standard way to connect machines, data, and people.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Control systems within an industrial facility may be configured to communicate with a distributed set of network connected devices, services, and platforms using an industrial internet network. For example, web applications hosted on a cloud computing system can be offered as services to allow a user to interact with the cloud-enabled control systems using applications running on a user's local device such as a mobile phone, tablet, desktop computer, and the like. This interaction can increase the convenience and efficiency of many tasks associated with the control system. One such task is configuration and/or commissioning of the control system.

FIG. 1 schematically illustrates an exemplary cloud-enabled industrial control system that benefits from cloud-based creation of a configuration file. The system includes several computing environments.

Referring to FIG. 1, one computing environment 100 comprises a cloud-enabled industrial control system 114, which may include controller 116 and field agent 206. The controller 116 may communicate with one or more field devices 110 using a machine-to-machine protocol (e.g., OPC UA. ProfiNet, etc.). Field devices 110 may comprise, for example, devices that create analog or digital signals that are received by the controller 116 such as level transmitter, alarms, and the like. Field devices 110 may also comprise, for example, devices that receive analog or digital signals that originate from the controller 116 such as control signals to motorized valves, speed signals, start and shut-down signals, and the like. Field devices 110 may also comprise, for example, motors and/or motor control centers, and the like. The cloud-enabled industrial control system further includes the field agent 206. The field agent provides a communicative connection between the cloud-enabled industrial control system 114 and a cloud computing system 200. The field agent 206 may be incorporated within and comprise a portion of the controller 116. For example, the field agent 206 may comprise software instructions that are stored with in a memory of the field agent 206 and are executed by a processor of the field agent. As noted herein, the field agent 206 enables the controller 116 to communicate with the cloud computing system 200. In other instances, the field agent 206 may comprise a stand-alone device or other devices that include a processor. In some instances the field agent 206 connects with the cloud computing system 200 through an internet service provider (ISP) cloud connection 210. The connection to the cloud computing system 200 may optionally include a firewall 212 for security purposes.

Optionally, another computing environment 112 comprises a control room 104, which may include a computer 106 (e.g., a desktop, a laptop, and the like). The computer 106 may execute software instructions that comprise an application that provides a user (e.g., a project manager, a supervisor, an operator, etc.) an interface that allows the user to interact with the cloud-enabled industrial control system 114 and/or the cloud computing system 200.

Figure 2:
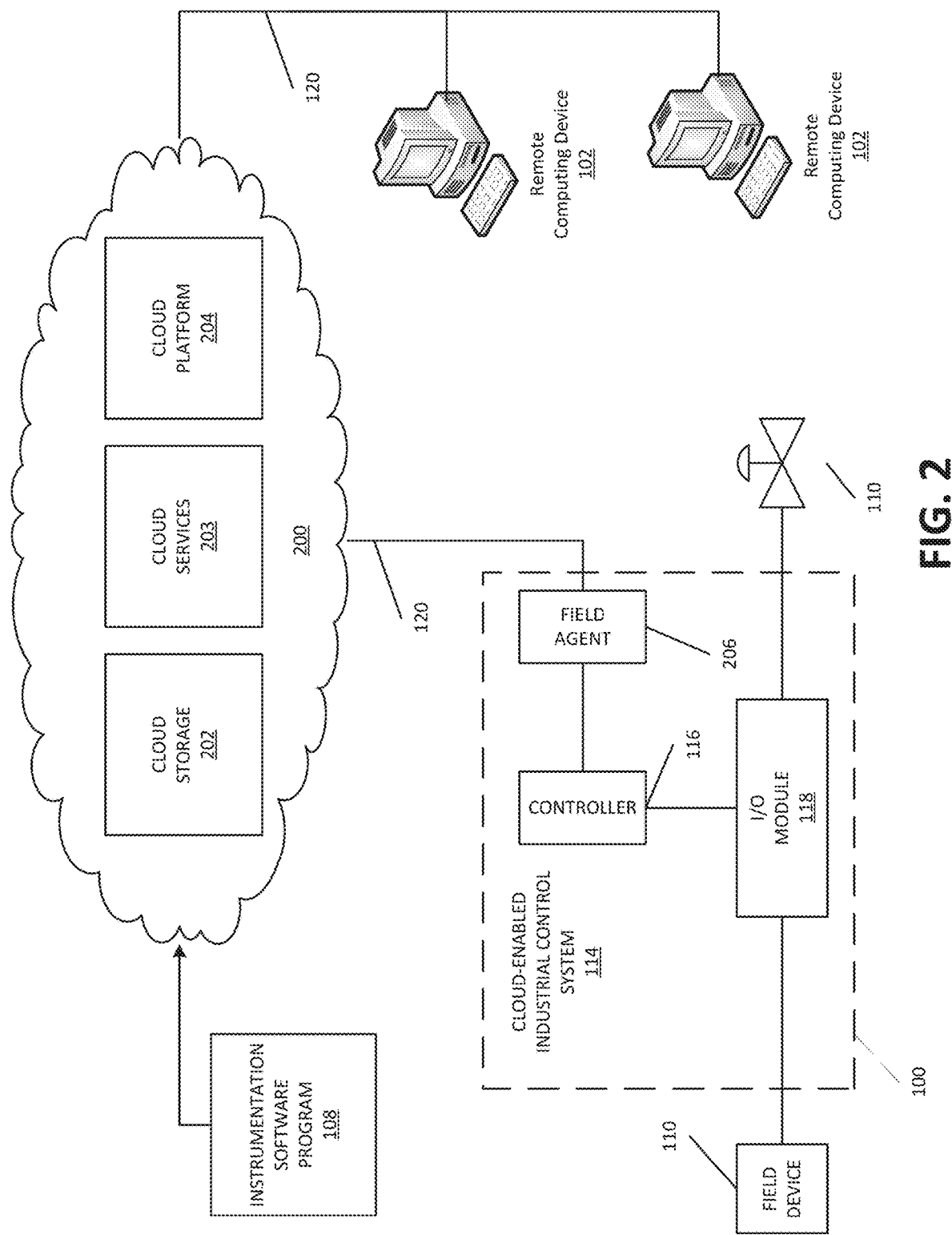
FIG. 2 schematically depicts a cloud-enabled industrial control system that benefits from the disclosed methods, with additional details of an exemplary cloud computing system.

One or more users using one or more remote computing devices 102 that are communicatively coupled with the cloud computing system 200 may access the cloud computing system 200 over communication connections 120, described below. With proper authorizations, the one or more users using the one or more remote computing devices 102 may access any one or more of a cloud storage 202, a cloud service 203 (e.g., web applications), and/or a cloud platform 204, which comprise the cloud computing system 200 as shown in FIG. 2. The cloud computing system 200 may include distributed (networked) resources that are made widely available via communications connections 120 such as internet connections, wireless fidelity ((WiFi), IEEE Standard 802.11n, where "n" indicates a version number, said standard incorporated by reference) connections, cellular connections, and the like. The resources may include the cloud storage 202, the cloud services 203 (e.g., web applications), and/or the cloud platform 204 (e.g., Predix™ operating system).

The one or more users using the one or more remote computing devices 102 that are communicatively coupled with the cloud computing system 200 to access the cloud computing system 200 over the communication connections 120 are able to collaborate to configure instrument data received by the cloud computing system 200. As used herein, "collaborate" has its dictionary definition, namely allowing the one or more users to work jointly on the received instrument data to produce an instrument index for the cloud-enabled industrial control system. All or a portion of the instrument data may be created and/or produced by an instrumentation software program 108. The instrumentation software program 108 may comprise commercially-available software that is used to design and/or configure a control system such as cloud-enabled industrial control system 114. As noted above, one such instrumentation software program 108 is SmartPlant™, as available from Intergraph, though other programs from other vendors may also be used. In some instances, an engineering, procurement and construction (EPC) firm may design and/or configure the cloud-enabled industrial control system 114 and electronically transfer design files over the communication connections 120 to the cloud computing system 200.

Figure 3A:
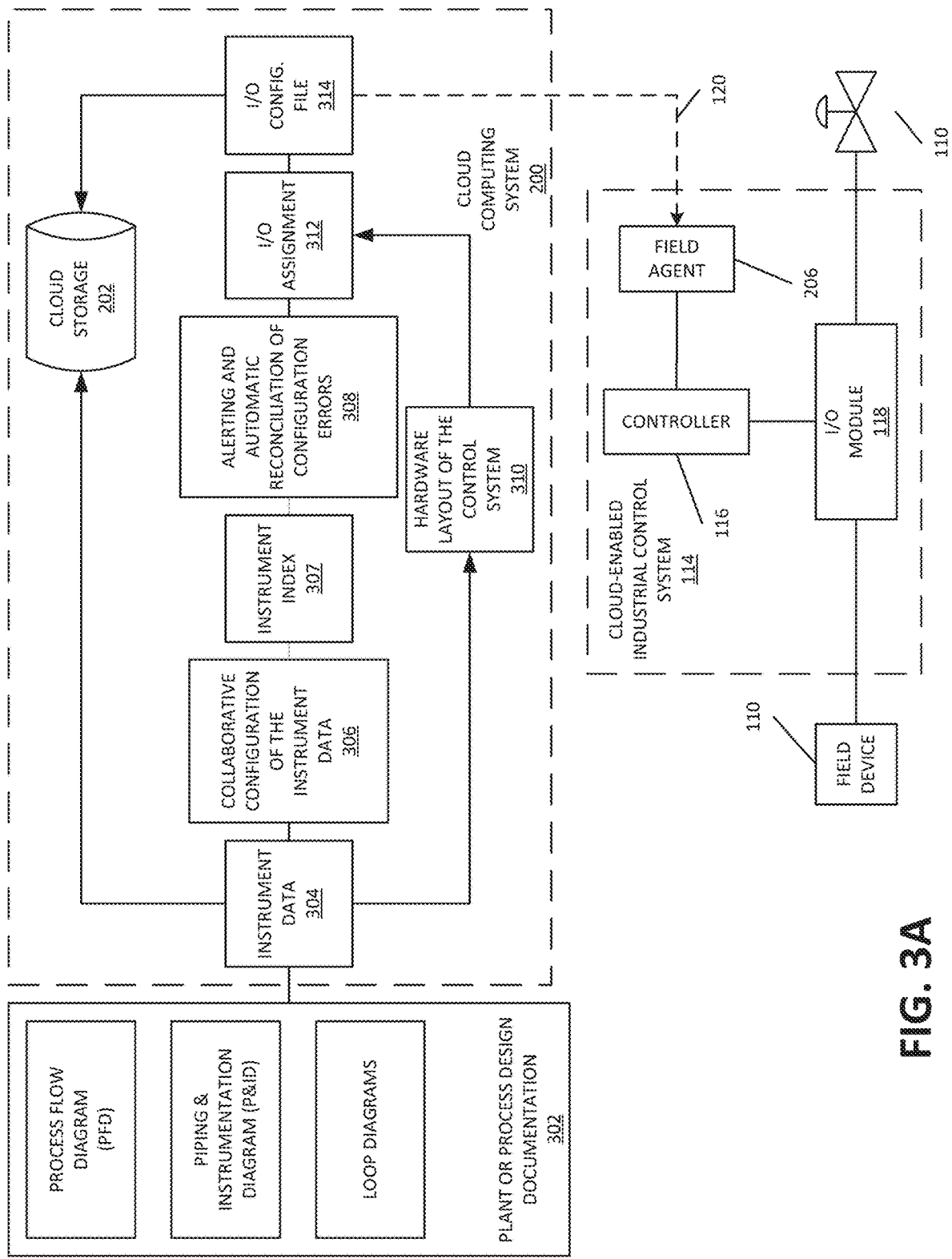
FIG. 3A illustrates an exemplary functional block diagram for creating a configuration file for a cloud-enabled industrial control system.

Referring now primarily to FIG. 3A, an exemplary functional block diagram for creating a configuration file for a cloud-enabled industrial control system 114 is described. Plant or process design documentation 302 is provided to the cloud computing system 200 to create instrument data 304. The plant or process design documentation 302 may comprise one or more of spreadsheets, process flow diagrams (PFDs), piping and instrument diagrams (P&IDs), loop diagrams, and the like. The plant or process design documentation 302 may be created using one or more instrumentation software programs, manually entered, or created in any other way that allows electronic transmission to the cloud computing system 200 to receive the instrument data 304.

Figure 3B:
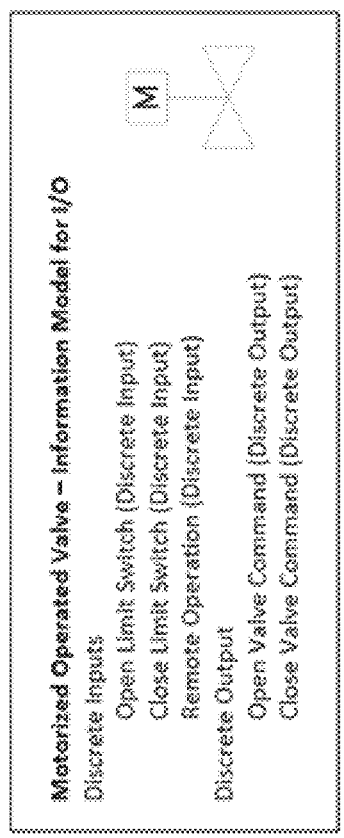
FIG. 3B illustrates an exemplary I/O model for a motorized-operated valve (MOV)

Once the instrument data 304 is received by the cloud computing system 200, collaborative configuration 306 of the instrument data can occur. Collaborative configuration 306 allows one or more users using one or more remote computing devices 102 to access the instrument data 304 through a collaborative configuration cloud service of the cloud computing system 200 to create an instrument index 307. Each of the one or more users access the instrument data 304 using the one or more remote computing devices 102 communicatively coupled to the cloud computing system 200. At 308, the instrument data 304 is analyzed by a cloud service, which alerts and automatically corrects configuration errors in the instrument index 307 that occurred during the collaborative configuration 306 of the instrument data. A rules engine cloud service creates a hardware layout 310 for at least a portion of the cloud-enabled industrial control system 114 using at least the instrument index and assigns 312 input/output (I/O) points from the instrument index to the hardware layout to create an I/O configuration file 314 for the cloud-enabled industrial control system 114. Additional inputs to the rules engine cloud service can include object definitions for devices that comprise the could-enabled industrial control system 114. These devices may include sensors, pumps, valves, tanks, drives, and the like. The one or more users using the one or more remote computing devices 102 can extend and/or modify the object definitions for devices. The object definitions for devices may include as non-limiting examples measurement objects (e.g., analog inputs, discrete inputs, discrete device control objects (e.g., pumps, agitators, fans, motorized-operated valves (MOVs), solenoid valves, etc.), analog actuators objects (e.g., modulating valves), and the like. Included in the object definitions for devices is an input/output (I/O) model for the device. FIG. 3B illustrates an exemplary I/O model for a MOV. Other inputs to the rules engine cloud service can include definitions of physical locations of enclosures (containing one or more I/O modules 118) within a specified plant (Plant Areas). A user can indicate whether the enclosure includes a controller 116, which may extend to mesh control where I/O modules 116 and controllers 118 are combined. Inputs to the rules engine cloud service may also include layout rules, P&ID diagrams (if not incorporated into the instrument index 307) and a device list (also if not incorporated into the instrument index 307). Layout rules may include, for example, instrument redundancy rules, where multiple instruments are measuring the identical process variable to protect the system from instrument failure; I/O spares requirements; power supply requirements; physical constraints; diversity requirements (e.g. each enclosure shall have approximately 25% Analog Input (AI), 15% Analog Output (AO), 35% Discrete Input (DI), and 25% Discrete Output (DO)); and the like. The rules engine cloud service creates the automation hardware layout 310 for the plant and the I/O configuration file 314 for the system based on these inputs. The inputs to the rules engine cloud service can come from third-parties (e.g., EPC firms and the like) having access to the cloud computing system 200, the one or more users using the one or more remote computing devices 102 that have access to the cloud computing system 200, and the like.

Generally, the hardware layout 310 indicates the number of I/O modules 118, the cabinets they are located in, and their position within the cabinets. The I/O assignments indicates and identifies the I/O points that are to be connected to each I/O module 118, where each I/O point is associated with one or more field devices 110. The I/O configuration file 314 may include an updated instrument index with assignment of physical I/O to channels on I/O modules where the I/O module is contained in an enclosure assigned to a Plant Area. The I/O configuration file 314 may also include a graphical view of the hardware system architecture.

The I/O configuration file 314 can be transferred from the cloud computing system 200 to the cloud-enabled industrial control system 114, where the cloud-enabled industrial control system 114 can be configured in accordance with the I/O configuration file 314. For example, the controller 116 and/or the I/O modules 118 of the cloud-enabled industrial control system 114 can be programmed to expect certain I/O points based on the I/O configuration file 314. In one example, the cloud-enabled industrial control system 114 is a control system used to control all or a portion of a power-generating facility.

Optionally, the instrument index 307 and/or the I/O configuration file 314 can be stored in in cloud storage where it may be accessed by users at some later point.

Figure 3C:
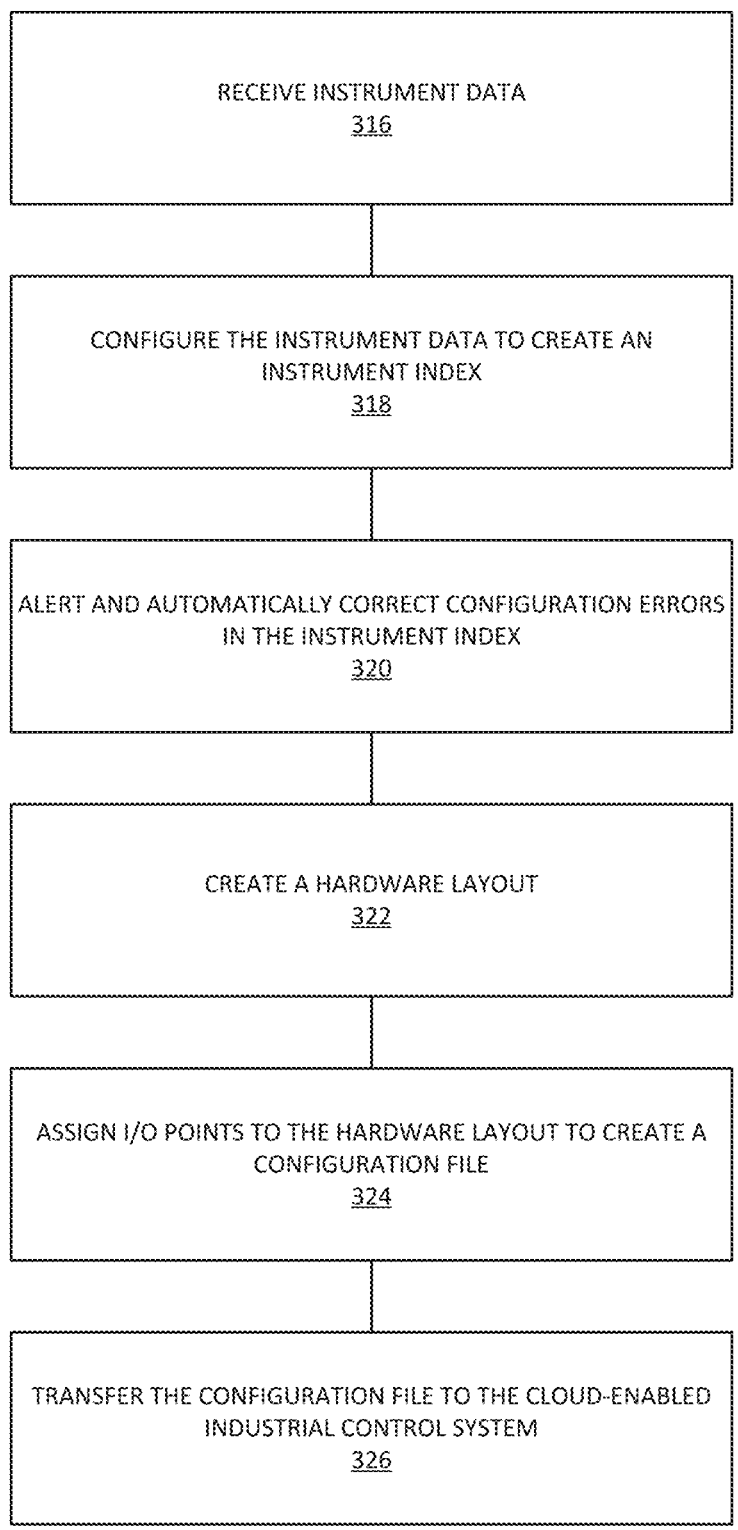
FIG. 3C is a flowchart that illustrates an exemplary method for creating a configuration file for a cloud-enabled industrial control system.

FIG. 3C is a flowchart that illustrates an exemplary method for creating a configuration file for a cloud-enabled industrial control system. The exemplary method comprises 316, receiving, by a cloud computing system 200, instrument data 304. In one aspect, the instrument data 304 may comprise one or more of spreadsheets, process flow diagrams (PFDs), piping and instrument diagrams (P&IDs), loop diagrams, and the like. In some instances, all or a portion of the instrument data 304 may at least partially comprise an output from an instrumentation software program 108. At 318, the instrument data 304 is configured by one or more users accessing the instrument data 304 using one or more remote computing devices 102 to create an instrument index. Access is provided to the instrument data 304 to the one or more users through a collaborative configuration cloud service of the cloud computing system 200 to create the instrument index 307. At 320, a cloud service executing in the cloud computing system 200 alerts and automatically corrects configuration errors in the instrument index 307 that occurred during the configuration of the instrument data 304. At 322, a rules engine cloud service creates a hardware layout 310 for at least a portion of the cloud-enabled industrial control system 114 using at least the instrument index 307 and one or more of object definitions for devices, layout rules and plant areas. At 324, the rules engine cloud service assigns input/output (I/O) points from the instrument index 307 to the hardware layout 310 to create an I/O configuration file 314 for the cloud-enabled industrial control system 114. At 326, the I/O configuration file 314 is transferred from the cloud computing system 200 to the cloud-enabled industrial control system 114. The I/O configuration file 314 can be used to configure the cloud-enabled industrial control system 114. In one aspect, the cloud-enabled industrial control system 114 may be used to control all or a portion of a power-generating facility. In some instances, one or more of the instrument index 307 and/or the I/O configuration file 314 may be stored in cloud storage 202.

Figure 4:
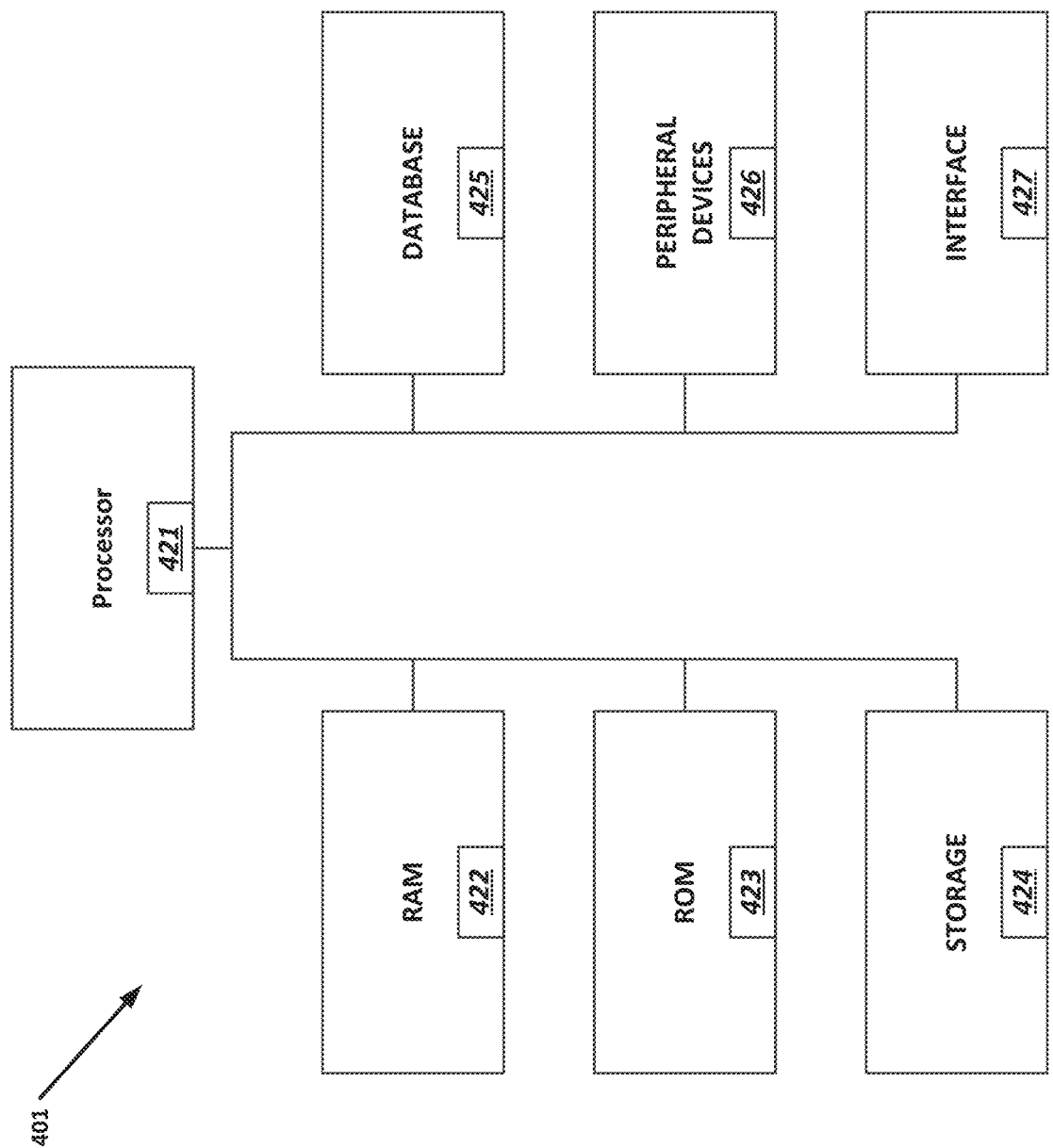
FIG. 4 is a block diagram illustrating an exemplary operating environment for performing the disclosed methods.

FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise network PCs, minicomputers, mainframe computers, controllers, smartphones, field agents, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

The operating environment of FIG. 4 can illustrate the exemplary controller 116 and/or at least a portion of the cloud computing system 200 that can be used for configuring a cloud-enabled industrial control system. In various aspects, the controller 401 of FIG. 4 may comprise all or a portion of the controller 116 of the cloud-enabled control system shown in FIGS. 1-3, or it may comprise all or a portion of the cloud computing system 200 of FIGS. 1-3, both of which are used for facilitating configuring a cloud-enabled industrial control system, as shown and/or described herein. As used herein, "controller" may include a plurality of controllers. The controllers may include one or more hardware components such as, for example, a processor 421, a random access memory (RAM) module 422, a read-only memory (ROM) module 423, a storage 424, a database 425, one or more peripheral devices 426, and an interface 427. Alternatively and/or additionally, controller 401 may include one or more software components such as, for example, a computer-readable medium including computer executable instructions for performing a method associated with the exemplary embodiments. It is contemplated that one or more of the hardware components listed above may be implemented using software. For example, storage 424 may include a software partition associated with one or more other hardware components. It is understood that the components listed above are exemplary only and not intended to be limiting.

Processor 421 may include one or more processors, each configured to execute instructions and process data to perform one or more functions associated with a computer for facilitating configuring one or more dedicated input/output (I/O) modules and terminal boards, one or more universal I/O modules, and the like. Processor 421 may be communicatively coupled to RAM 422, ROM 423, storage 424, database 425, peripheral devices 426, and interface 427. Processor 421 may be configured to execute sequences of computer program instructions to perform various processes. The computer program instructions may be loaded into RAM 422 for execution by processor 421.

RAM 422 and ROM 423 may each include one or more devices for storing information associated with operation of processor 421. For example, ROM 423 may include a memory device configured to access and store information associated with controller 401, including information for identifying, initializing, and monitoring the operation of one or more components and subsystems. RAM 422 may include a memory device for storing data associated with one or more operations of processor 421. For example, ROM 423 may load instructions into RAM 422 for execution by processor 421.

Storage 424 may include any type of mass storage device configured to store information that processor 421 may need to perform processes consistent with the disclosed embodiments. For example, storage 424 may include one or more magnetic and/or optical disk devices, such as hard drives, CD-ROMs, DVD-ROMs, or any other type of mass media device. Database 425 may include one or more software and/or hardware components that cooperate to store, organize, sort, filter, and/or arrange data used by controller 401 and/or processor 421. For example, database 425 may store data and/or instructions used to facilitate a method for creating a configuration file for a cloud-enabled industrial control system. The method may comprising receiving, by a cloud computing system, instrument data. The instrument data may be configured by providing access to the instrument data to one or more users using one or more remote computing devices through a collaborative configuration cloud service of the cloud computing system to create an instrument index. A cloud service alerts and automatically corrects configuration errors in the instrument index that occurred during the configuration of the instrument data. A rules engine cloud service using the instrument index creates a hardware layout for at least a portion of the cloud-enabled industrial control system and assigns input/output (I/O) points from the instrument index to the hardware layout to create an I/O configuration file for the cloud-enabled industrial control system. The I/O configuration file is transferred from the cloud computing system to the cloud-enabled industrial control system, where it can be used to configure the cloud-enabled industrial control system. Database 425 may also store additional and/or different information than that listed above.

Peripheral devices 426 may include one or more components configured to communicate information with a user associated with controller 401. For example, peripheral devices 426 may include a console with an integrated keyboard and mouse to allow a user to enter information for configuring the controller 401, field devices, and the like using a configuration tool. Peripheral devices 426 may also include a display including a graphical user interface (GUI) for outputting information on a monitor. Peripheral devices 426 may also include devices such as, for example, a printer for printing information associated with controller 401, a user-accessible disk drive (e.g., a USB port, a floppy, CD-ROM, or DVD-ROM drive, etc.) to allow a user to input data stored on a portable media device, a microphone, a speaker system, an image capture device (e.g. camera), or any other suitable type of interface device.

Interface 427 may include one or more components configured to transmit and receive data via the communication connections 120, which may comprise Internet, Ethernet, a local area network, a wide-area network, a workstation peer-to-peer network, a direct link network, a wireless network, or any other suitable communication platform. For example, interface 427 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of creating a configuration file for a cloud-enabled industrial control system, the method comprising:
   receiving, by a cloud computing system, instrument data;
   configuring the instrument data by providing access to the instrument data to one or more users through a collaborative configuration cloud service of the cloud computing system to create an instrument index, wherein the one or more users access the instrument data using one or more computing devices communicatively coupled to the cloud computing system;
   alerting and automatically correcting, by a cloud service, configuration errors in the instrument index that occurred during the configuration of the instrument data;
   creating, by a rules engine cloud service using at least the instrument index, a hardware layout for at least a portion of the cloud-enabled industrial control system;
   assigning, by the rules engine cloud service, input/output (I/O) points from the instrument index to the hardware layout to create an I/O configuration file for the cloud-enabled industrial control system; and
   transferring the I/O configuration file from the cloud computing system to the cloud-enabled industrial control system.

2. The method of claim 1, further comprising configuring the cloud-enabled industrial control system according to the I/O configuration file.

3. The method of claim 1, wherein the instrument data comprises one or more of a process flow diagram (PFD), a piping and instrument diagram (P&ID), or a loop diagram.

4. The method of claim 1, wherein the instrument data at least partially comprises an output from an instrumentation software program.

5. The method of claim 1, wherein the cloud-enabled industrial control system is used to control a power-generating facility.

6. The method of claim 1, further comprising storing one or more of the instrument index or the I/O configuration file in cloud storage.

7. The method of claim 1, wherein additional inputs to the rules engine cloud service for creating the hardware layout and assigning I/O points to the hardware layout to create the I/O configuration file include one or more of object definitions for devices, layout rules and plant areas.

8. A system that creates a configuration file for a cloud-enabled industrial control system, the system comprising:
   a cloud computing system, wherein the cloud computing system comprises at least a cloud platform and one or more cloud services executing on the cloud platform; and
   one or more computing devices communicatively coupled to the cloud computing system, wherein the cloud computing system:
   receives instrument data;
   provides access to the instrument data for configuration of the instrument data by one or more users through a configuration cloud service of the cloud computing system to create an instrument index, wherein the one or more users access the instrument data using the one or more computing devices communicatively coupled to the cloud computing system;
   alerts and automatically corrects, by a cloud service, configuration errors in the instrument index that occurred during the configuration of the instrument data;
   creates, by a rules engine cloud service using at least the instrument index, a hardware layout for at least a portion of the cloud-enabled industrial control system;
   assigns, by the rules engine cloud service, input/output (I/O) points from the instrument index to the hardware layout to create an I/O configuration file for the cloud-enabled industrial control system; and
   transfers the I/O configuration file from the cloud computing system to the cloud-enabled industrial control system.

9. The system of claim 8, wherein the cloud-enabled industrial control system is configured in accordance with the I/O configuration file.

10. The system of claim 8, wherein the instrument data comprises one or more of a process flow diagram (PFD), a piping and instrument diagram (P&ID), or a loop diagram.

11. The system of claim 8, wherein the instrument data at least partially comprises an output from an instrumentation software program.

12. The system of claim 8, wherein the cloud-enabled industrial control system is used to control a power-generating facility.

13. The system of claim 8, wherein the cloud computing system further comprises cloud storage and one or more of the instrument index or the I/O configuration file are stored in the cloud storage.

14. The system of claim 8, wherein the cloud computing system further comprises additional inputs to the rules engine cloud service for creating the hardware layout and assigning I/O points to the hardware layout to create the I/O configuration the include one or more of object definitions for devices, layout rules and plant areas.

15. A cloud-enabled industrial control system comprising:
a cloud computing system, wherein the cloud computing system comprises at least a cloud platform, one or more cloud services executing on the cloud platform, and cloud storage;
an industrial control system that is communicatively coupled with the cloud computing system; and
one or more computing devices communicatively coupled to the cloud computing system, wherein the cloud computing system:
receives instrument data;
provides access to the instrument data for configuration of the instrument data by one or more users through a collaborative configuration cloud service of the cloud computing system to create an instrument index, wherein the one or more users access the instrument data using the one or more computing devices communicatively coupled to the cloud computing system;
alerts and automatically correct, by an expert system cloud service, configuration errors in the instrument index that occurred during the configuration of the instrument data;
creates, by a rules engine cloud service using the instrument index and one or more of object definitions for devices, layout rules and plant areas, a hardware layout for at least a portion of the industrial control system;
assigns, by the rules engine cloud service, input/output (I/O) points from the instrument index to the hardware layout to create an I/O configuration file for the industrial control system; and
transfers the I/O configuration file from the cloud computing system to the industrial control system.

16. The system of claim 15, wherein the industrial control system is configured in accordance with the I/O configuration file.

17. The system of claim 15, wherein the instrument data comprises one or more of a process flow diagram (PFD), a piping and instrument diagram (P&ID), or a loop diagram.

18. The system of claim 15, wherein the instrument data at least partially comprises an output from an instrumentation software program.

19. The system of claim 15, wherein the industrial control system is used to control a power-generating facility.

20. The system of claim 15, wherein one or more of the instrument index or the I/O configuration file are stored in the cloud storage.

* * * * *